United States Patent [19]

Peterson et al.

[11] Patent Number: 5,391,586
[45] Date of Patent: Feb. 21, 1995

[54] PROCESS FOR PREPARING FLEXIBLE POLYURETHANE FOAMS AND FOAMS THUS OBTAINED

[75] Inventors: A. Leslie Peterson, Coraopolis; Richard A. Riccitelli, Monaca, both of Pa.

[73] Assignee: Miles Inc., Pittsburgh, Pa.

[21] Appl. No.: 925,344

[22] Filed: Aug. 4, 1992

[51] Int. Cl.$^6$ ............................................. C08G 18/70
[52] U.S. Cl. ..................... 521/160; 264/53; 264/54; 521/174
[58] Field of Search .................... 521/99, 82, 160, 174, 521/914; 264/51, 53, 54

[56] References Cited

U.S. PATENT DOCUMENTS

| | | | |
|---|---|---|---|
| 2,929,802 | 3/1960 | Katz | 260/77.5 |
| 3,072,582 | 1/1963 | Frost | 260/2.5 |
| 3,325,823 | 6/1967 | Boon | 264/41 |
| 3,360,495 | 12/1967 | Muller et al. | 524/761 |
| 3,957,889 | 5/1976 | Milligan et al. | 568/937 |
| 4,072,637 | 2/1978 | Blount | 521/121 |
| 4,246,356 | 1/1981 | Walmsley | 521/50 |
| 4,497,913 | 2/1985 | Raes et al. | 521/137 |
| 4,782,099 | 11/1988 | Dietrich et al. | 521/175 |

FOREIGN PATENT DOCUMENTS 449609 10/1991 European Pat. Off. .

OTHER PUBLICATIONS

Chemical Abstracts, vol. 109, No. 8, Abstract No. 55883q.

*Primary Examiner*—Allan R. Kuhns
*Attorney, Agent, or Firm*—Joseph C. Gil; Godfried R. Akorli; Lyndanne M. Whalen

[57] ABSTRACT

A process for the production of flexible polyurethane foams by the reaction of a polyol and water with polyisocyanate in the presence of a blowing agent, the improvement wherein the polyisocyanate includes toluene diisocyanate having a 2,4-isomer to 2,6-isomer ratio is greater than 80:20. The invention encompasses a process for increasing softness of flexible foams by reacting a secondary hydroxyl terminated polyol with a polyisocyanate in the presence of a blowing agent of carbon dioxide derived from the polyisocyanate/water reaction, a substantially low amount of an auxiliary blowing agent, and the polyisocyanate including toluene diisocyanate having a 2,4-isomer to a 2,6-isomer ratio greater than 80:20. It has been found that by the present invention that there is obtained flexible polyurethane foams having the unexpected properties of 15% to 23% softening, increased tear strength, increased tensile strength, and increased percent elongation, and very little change in compression set properties.

8 Claims, No Drawings

PROCESS FOR PREPARING FLEXIBLE POLYURETHANE FOAMS AND FOAMS THUS OBTAINED

BACKGROUND OF THE INVENTION

1. Field of the Invention

The present invention relates to a process for preparing polyurethane foams which are based on toluene diisocyanates. More specifically the present invention relates to a process wherein the isomer ratio of toluene diisocyanate is varied to impart to the resultant foams certain improvements in performance properties.

2. Summary of the Prior Art

The use of toluene diisocyanate in the preparation of flexible foams is generally known in the art. The following patents provide examples of the use of toluene diisocyanates in the preparation of polyurethane foams. See U.S. Pat. Nos. 2,929,802, 3,072,582, 3,325,823 and 4,246,356.

In the preparation of flexible foams, there are employed auxiliaries and additives, pertinent among which are blowing agents. The use of auxiliary blowing agents serves the purposes of controlling the foaming (exothermic) temperatures and controlling foam hardness. However, with the advent of relevant environmental regulations, the use of otherwise effective chloroflorocarbons as an auxiliary blowing agent is being curtailed or eliminated. As would be realized, the reduction in the use of the auxiliary blowing agents adversely affects foam hardness. Hence, much work is being done to find replacements for the chloroflorocarbon type auxiliary blowing agents.

The present invention provides a means for preparing flexible polyurethane foams with the desirable hardness with essentially no auxiliary blowing agents.

SUMMARY OF INVENTION

In accordance with the foregoing, the present invention encompasses an improved process for the production of flexible polyurethane foams by the reaction of a polyol and water with polyisocyanate in the presence of a blowing agent, the improvement wherein the polyisocyanate comprises toluene diisocyanate having a 2,4-isomer to 2,6-isomer ratio is greater than 80:20.

In a presently preferred embodiment, the invention encompasses an improved process for increasing softness of flexible foams by reacting a secondary hydroxyl terminated polyol with a polyisocyanate in the presence of a blowing agent, the improvement comprising the blowing agent consisting essentially of carbon dioxide derived from the polyisocyanate/water reaction, a substantially low amount of an auxiliary blowing agent, and the polyisocyanate comprising toluene diisocyanate having a 2,4-isomer to a 2,6-isomer ratio greater than 80:20.

It has been found that by the present invention that there is obtained flexible polyurethane foams having the unexpected properties of 15% to 23% increased softening, increased tear strength, increased tensile strength, and increased percent elongation, and very little change in compression set properties.

DETAILED DESCRIPTION OF THE INVENTION

As afore-stated, the claimed process comprises preparing polyurethane foams comprising reacting a polyol with a polyisocyanate in the presence of a blowing agent containing a substantially low amount of an auxiliary agent wherein the polyisocyanate comprises toluene diisocyanate having 2,4-isomer to the 2,6-isomer ratio which is greater than 80:20. Typically, the polyols useful herein comprise secondary hydroxyl terminated polyols. The useful polyols have molecular weight in the range of about 1000 to 6000 and preferably 2000 to 4000, and hydroxyl value of 27 to 112 and preferably 40 to 60.

The preferred polyols are characterized as inactive polyols, in that they consist essentially of secondary hydroxyl terminated polyols. Illustrative of the secondary hydroxyl terminated polyols are polyoxyalkylene polyols terminated with propylene oxide. The hydroxyl value of the secondary hydroxyl terminated polyols is in the range of 27 to 112 and preferably 40 to 60. The useful polyoxyalkyl polyols (polyether polyols) and the method of preparing the same are disclosed by Sanders and Frisch, Polyurethanes: Chemistry and Technology, Part II, Chapter VII which is hereby incorporated by reference.

In accordance with the invention, the ratio of 2,4-isomer to 2,6-isomer of toluene diisocyanate is greater than 80:20. Generally, the ratio can be from about 88:12 to 82:18. Typically, the 2,4- and 2,6-isomer ratio is at least about 85:15. Toluene diisocyanate with the isomer ratio greater than 80:20 can be prepared by art-known techniques.

In the reaction of the polyol with toluene diisocyanate, the isocyanate index can be from 90 to 120 and preferably from 95 to 105. Other polyisocyanates can be employed in combination with toluene diisocyanate. The composition and proportion of the other polyisocyanates would depend on their intended end use. Generally, the other polyisocyanate can be employed in an amount of 10% to 50%.

Suitable blowing agents for the invention can be selected from the group consisting of chloroflorocarbons, e.g., CFC-11, methylene chloride, acetone, methyl chloroform and carbon dioxide. It is, however, a distinct feature of the invention that low density foams having a density of less than 25 kg/m$^3$, typically in the range of 16 to 20 kg/m$^3$ can be prepared by using carbon dioxide derived from the reaction of water, a polyisocyanate, and a substantially low amount of an auxiliary blowing agent. Typically, water is employed in an amount of 2% to 6% and preferably from 2% to 6% of the total polyol amount. By the term "substantially low amount" of auxiliary blowing agents is meant an amount of from 0 to about 8 parts by weight of auxiliary agents, such as, methylene chloride, acetone, methyl chloroform or chloroflorocarbon.

Suitable catalysts can be selected from the group consisting of tertiary amines, organometallic salts, such as stannous octoate, dibutyltin dilaurate and tin mercaptides and certain salts of lead and mercury and antimony.

As additives, there can be employed herein conventional ones such as fillers, pigments, reinforcing agents, plasticizers, flame retardants, anti-oxidants, surfactants, stabilizers and the like.

The ingredients for the polyurethane foams can be processed by techniques that are known in the art. The resultant polyurethane foams are characterized by the improved properties of tear strength, tensile strength, elongation, and softening.

These and other aspects of the invention are further illustrated by the following non-limiting examples of the claimed invention.

EXAMPLES

Flexible foams in accordance with this invention were prepared with a series of formulation identified in Table 1. The results from the evaluation of the foams are also reported in Table 1.

TABLE 1

| | Evaluation | | | | | | |
|---|---|---|---|---|---|---|---|
| | Example #1 | Example #2 | Example #3 | Example #4 | Example #5 | Example #6 | Example #7 |
| Formula: | | | | | | | |
| M7057[1] | 100.00 | 100.00 | 100.00 | 100.00 | 100.00 | 100.00 | 100.00 |
| 2.4-/2,6-TDI (PBW) | 80/20 | 86/14 | 90/10 | 86/14 | 80/20 | 86/14 | 88/12 |
| | 38.70 | 38.70 | 48.70 | 48.70 | 59.90 | 59.90 | 59.90 |
| Index | 100.00 | 100.00 | 105.00 | 105.00 | 105.00 | 105.00 | 105.00 |
| Water | 3.10 | 3.10 | 3.90 | 3.90 | 5.00 | 5.00 | 5.00 |
| A-1/33LV[2] | 0.20 | 0.20 | 0.20 | 0.20 | — | — | — |
| PC-70[3] | — | — | — | — | 0.30 | 0.30 | 0.30 |
| T-9[4] | 22 | 0.22 | 0.22 | 0.22 | — | — | — |
| Foamrez EC 80 | — | — | — | — | 0.80 | 0.80 | 0.80 |
| BF2370[6] | 1.00 | 1.00 | 1.00 | 1.00 | 1.00 | 1.00 | 1.00 |
| Physical Properties: | | | | | | | |
| Density[7] | 1.77 | 1.74 | 1.47 | 1.47 | 1.16 | 1.23 | 1.20 |
| IFD 25%[8] | 28.54 | 24.24 | 33.30 | 28.32 | 31.23 | 25.22 | 23.97 |
| IFD 65%[9] | 56.84 | 51.34 | 65.60 | 57.14 | 62.76 | 53.75 | 48.74 |
| SAG Factor[10] | 1.99 | 2.12 | 1.97 | 2.02 | 2.01 | 2.13 | 2.03 |
| Recovery[11] | 75.44 | 75.17 | 70.69 | 72.56 | 66.35 | 70.26 | 69.75 |
| Tensile[12] | 15.10 | 15.20 | 17.40 | 18.60 | 15.70 | 17.20 | 15.20 |
| Elongation[13] | 266.10 | 313.50 | 232.40 | 258.10 | 191.60 | 227.50 | 237.90 |
| Tear[14] | 2.43 | 2.28 | 2.57 | 2.81 | 2.40 | 2.50 | 2.55 |
| Air Flow[15] | 4.60 | 1.70 | 5.00 | 3.00 | 6.50 | 5.25 | 4.90 |
| Set 90% 1A[16] | 4.10 | 8.40 | 4.10 | 5.40 | 5.00 | 5.80 | 6.40 |

[1]Polyol from Miles Inc.
[2]Blend of Union Carbide Corporation "Niax A-1" amine catalyst and Air Products "Dabco 33LV" amine catalyst.
[3]Air Products "Polycat 70" amine catalyst.
[4]Air Products Dabco, tin catalyst.
[5]Witco Corp. tin catalyst.
[6]TH Goldschmidt Co., silicone surfactant.
7-16 ASTM: 03574-81
[7]Test A
[8]Test B
[9]Test B
[10]Test B
[11]Test B
[12]Test E
[13]Test E
[14]Test F
[15]Test G
[16]Test D The foregoing shows the softening effect, increase in tensile and elongation properties and in most cases the increase in tear strength as a result of changing the 2,4-isomer ratio.

ADDITIONAL EXAMPLES

Samples of flexible polyurethane foam were evaluated to determine the isomer ratio of the toluene diisocyanate (TDI) used in the foam production by analysis of toluene diamine (TDA) resulting from hydrolysis of the foam.

The foams were hydrolyzed in methanolic KOH. One completion of the hydrolysis, the methanol was evaporated and the hydrolyzate was reconstituted in water. The polyol and TDA components were isolated from the hydrolyzate by ether extraction, and the TDA isomer content was determined by HPLC analysis.

Results

The results of the isomer ratio determination are listed below.

| Sample Label | 2,4-Isomer % | 2,6-Isomer % |
|---|---|---|
| A | 83.2 | 16.8 |
| B | 79.8 | 20.2 |
| C | 86.9 | 13.1 |

Samples of flexible polyurethane foam were evaluated to determine the correct 2,4- to 2,6-TDI isomer ratio used in the manufacture.

The foams were hydrolyzed in the methanolic KOH. On completion of the hydrolysis, the methanol was evaporated and the hydrolyzate was reconstituted in water. The polyol and TDA components were isolated from the hydrolyzate by ether extraction. The TDA determinations were performed by injecting 10 μL aliquots of 14% solutions of sample dissolved in acetonitrile onto a "Hypersil ODS" column (250×4.6 mm) with 1.0 mL/minutes flow rate of A=90/10 water-/acetonitrile (0.5 mL TEA/L) and B=acetonitrile using diode array detection at 240 nm. Calibration was performed by external standardization.

| Sample Label | Isomer Content | |
|---|---|---|
| | 2,4-TDA | 2,6-TDA |
| D | 85.7 | 14.3 |
| E | 80.9 | 19.1 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of flexible polyurethane foams by reacting a polyol consisting essentially of a secondary hydroxyl-terminated polyol with a polyisocyanate in the presence of a blowing agent wherein the polyisocyanate comprises toluene diisocyanate having a 2,4-isomer to 2,6-isomer ratio is greater than 80:20, and wherein the blowing agent is substantially free of an auxiliary blowing agent.

2. A process as claimed in claim 1 wherein the blowing agent comprises water.

3. A process of claim 1 wherein the ratio of the 2,4-isomer to 2,6- isomer of the toluene diisocyanate is at least 85:15.

4. A process for the production of a flexible polyurethane foams as recited in claim 1 having a density of less than about 25 kg/m$^3$ by reacting a polyol with polyisocyanate in the presence of a blowing agent wherein the polyisocyanate comprises toluene diisocyanate having a 2,4- isomer to 2,6- isomer ratio greater than 80:20 and the blowing agent comprises water and is essentially free of chloroflorocarbon.

5. An improved process for the production of flexible polyurethane foams comprising reacting an inactive polyol consisting essentially of a secondary hydroxyl-terminated polyol with a polyisocyanate in the presence of a blowing agent, the improvement comprising the polyisocyanate comprising toluene diisocyanate having a 2,4-isomer to 2,6-isomer ratio greater than 80:20, the blowing agent consisting essentially of carbon dioxide derived from the reaction of water and the polyisocyanate and a substantially low amount of an auxiliary blowing agent.

6. The process of claim 5 wherein the polyol has a molecular weight of 1000 to 6000.

7. The process of claim 5 wherein the isomer ratio of the toluene diisocyanate is from about 88:12 to 82:18.

8. A polyurethane foam which is prepared by the process of claim 5.

* * * * *